(12) United States Patent
Maguire et al.

(10) Patent No.: US 9,930,079 B2
(45) Date of Patent: Mar. 27, 2018

(54) DEVICE-DRIVEN SOCIAL NETWORK

(71) Applicant: Facebook, Inc., Menlo Park, CA (US)

(72) Inventors: Yael G. Maguire, Boston, MA (US); Damian Kowalewski, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 222 days.

(21) Appl. No.: 14/335,795

(22) Filed: Jul. 18, 2014

(65) Prior Publication Data
US 2016/0021152 A1 Jan. 21, 2016

(51) Int. Cl.
G06F 15/16 (2006.01)
H04L 29/06 (2006.01)
G06F 17/30 (2006.01)
H04W 4/20 (2018.01)
H04W 12/06 (2009.01)
G06Q 50/10 (2012.01)

(52) U.S. Cl.
CPC ........ H04L 65/403 (2013.01); G06F 17/3087 (2013.01); G06F 17/30268 (2013.01); G06Q 50/10 (2013.01); H04W 4/206 (2013.01); H04W 12/06 (2013.01)

(58) Field of Classification Search
CPC .......... G06F 17/30268; G06F 17/3087; H04W 4/206
USPC ......................................... 709/204, 223–224
See application file for complete search history.

(56) References Cited

U.S. PATENT DOCUMENTS

| 8,060,909 | B2 | 11/2011 | Krikorian | |
|---|---|---|---|---|
| 2008/0084875 | A1 | 4/2008 | Parkkinen | |
| 2008/0102856 | A1* | 5/2008 | Fortescue | G06Q 30/02 455/456.1 |
| 2009/0030792 | A1* | 1/2009 | Khivesara | G06Q 30/0253 705/14.51 |
| 2010/0247642 | A1 | 9/2010 | Wu | |
| 2010/0274815 | A1 | 10/2010 | Vanasco | |
| 2012/0230540 | A1* | 9/2012 | Calman | G06K 9/00221 382/103 |
| 2012/0304257 | A1 | 11/2012 | Kalofonos | |
| 2013/0036165 | A1* | 2/2013 | Tseng | G06Q 50/01 709/204 |
| 2013/0185355 | A1* | 7/2013 | Tseng | H04L 65/403 709/204 |
| 2013/0212648 | A1 | 8/2013 | Tietjen | |
| 2014/0072182 | A1* | 3/2014 | Sochat | G06K 9/00221 382/116 |
| 2014/0082702 | A1 | 3/2014 | Supalla | |

(Continued)

OTHER PUBLICATIONS

Non-Final Office Action for U.S. Appl. No. 14/335,809, Nov. 5, 2015.
U.S. Appl. No. 14/335,809, filed Jul. 18, 2014, Maguire.

Primary Examiner — Philip B Tran
(74) Attorney, Agent, or Firm — Baker Botts L.L.P.

(57) ABSTRACT

In one embodiment, a method includes receiving information from a network-enabled device, the network-enabled device being associated with a first user of a social-networking system. The information indicates that the physical presence of an item has been detected by one or more sensors of the network-enabled device. The method further includes identifying the item based on the received information and providing information about the identified item to one or more second users of the social-networking system.

39 Claims, 9 Drawing Sheets

(56) References Cited

U.S. PATENT DOCUMENTS

2014/0108383 A1   4/2014  Chan
2015/0019523 A1*  1/2015  Lior .................... G06Q 10/109
                                                707/708

* cited by examiner

DEVICE-DRIVEN SOCIAL NETWORK

TECHNICAL FIELD

This disclosure generally relates to network-enabled devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, altimeter, accelerometer, or gyroscope. Such a device may also include functionality for wireless communication over any conventional technology, such as, by way of example and not limitation, BLUETOOTH, near-field communication (NFC), radio frequency (e.g., RFID), infrared (IR), Wi-Fi, pager, or cellular (e.g., 2G, 3G, 4G). Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a network-enabled device may be associated with a user via a secure process. A newly-purchased network-enabled device may connect with a user application installed on a personal device of the user (e.g., smartphone or tablet) that exchanges authentication information with the new device, retrieves device information from the cloud, enables the device to connect directly to the cloud through a local access point (e.g., home Wi-Fi network), and retrieves (from the cloud) a user interface to control the device.

In particular embodiments, a network-enabled device may connect with a network and rely upon cloud computing or machine learning to operate with intelligence even when newly-acquired. As an example and not by way of limitation, a refrigerator may include cameras to take pictures of items placed in the refrigerator and upload the images to the cloud, where image recognition may be performed upon the images, and an identification of the items may be provided to the refrigerator. As another example, a refrigerator may retrieve recipes from the cloud based on the items in the refrigerator and user-preference information from the user's social network.

Particular embodiments provide a method of remotely controlling devices in a device cloud that is associated with a user through manual configuration or automatic adjustment. Some devices in a user's device cloud may be able to control other devices in the user's device cloud. Based on social-networking information for a user, other users (e.g., family members or close friends) may be authorized to connect to and control a user's devices. In particular embodiments, changes and/or activity detected by one user's devices may result in the control of devices associated with the other users. Such inter-user connectivity/interactivity may be mediated/governed by way of a social-networking system. For example, particular users within a user's friends or special groups (e.g., "family") may be recognized by the user's devices and/or may have access to information captured by the user's devices.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
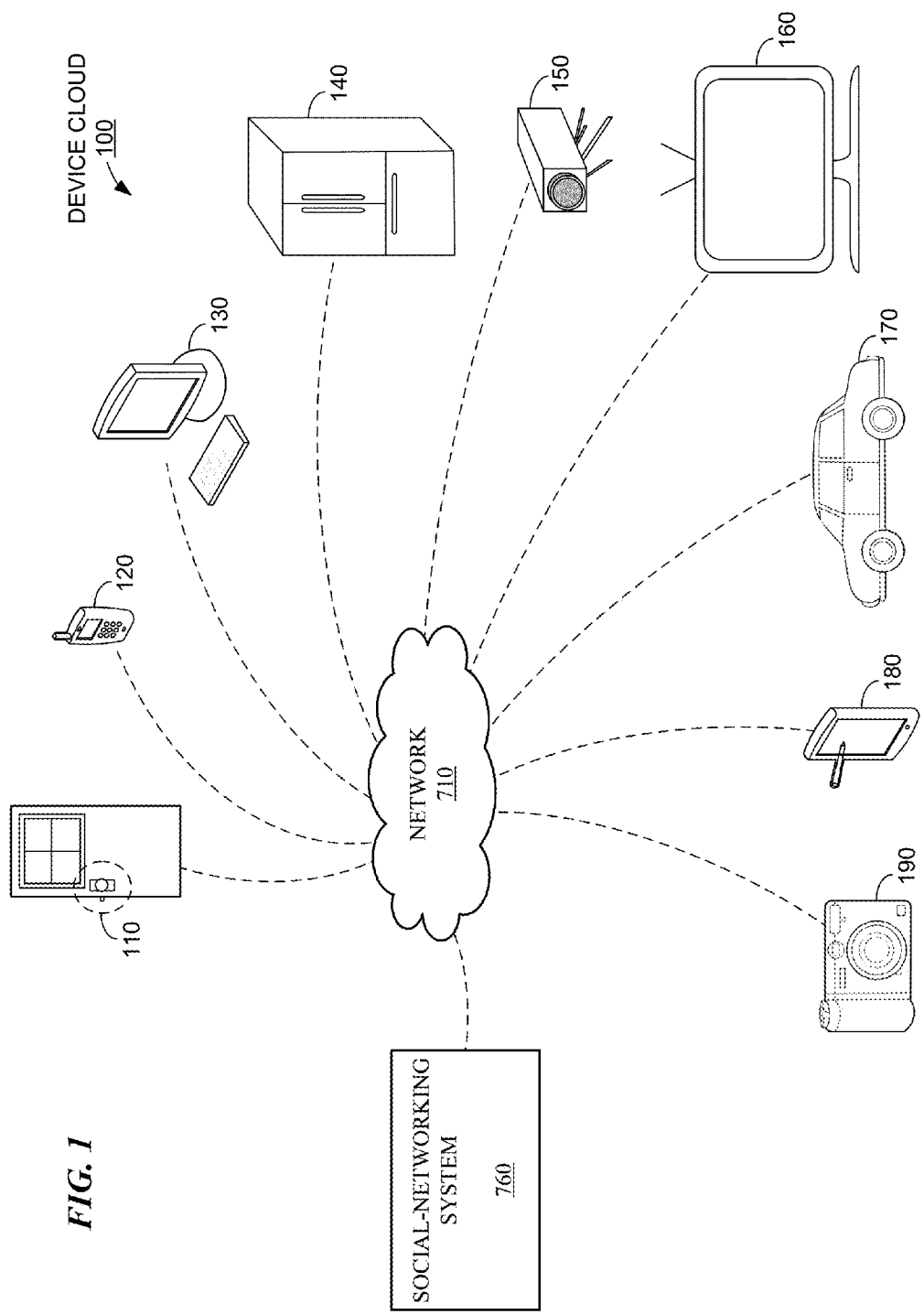
FIG. 1 illustrates an example device cloud.

FIG. 1 illustrates an example device cloud 100. In particular embodiments, device cloud 100 may include one or more network-enabled devices which may be associated with a user. In particular embodiments, a network-enabled device may comprise any device that includes at least one processor and at least one mode of network connectivity. As illustrated in FIG. 1, examples of network-enabled devices include door-lock mechanism 110, phone 120, desktop computer 130, refrigerator 140, security system 150, television (TV) 160, automobile 170, tablet 180, or camera 190. Although this disclosure describes and illustrates particular network-enabled devices, this disclosure contemplates any suitable network-enabled devices.

In particular embodiments, a network-enabled device may include antennae and one or more low-power and high-power radios for various types of network connections, e.g., cellular (e.g., 2G/3G/4G/4G LTE), Wi-Fi (e.g., 802.11n, 802.11ac, 802.11ad WiGig), Wi-Fi-based higher-level protocols (e.g., INTEL WIRELESS DISPLAY (WiDi), Wi-Fi mesh (e.g., ITU-T G.hn)), TV whitespace/mesh (TVWS, or 802.11af), Global Positioning System (GPS), Bluetooth, Bluetooth Low Energy (BLE), near-field communication (NFC), satellite, pager radio, etc. In particular embodiments, a network-enabled device may also include external physical features, such as, for example and not by way of limitation, a button interface, a status indicator, a small/low-power screen, a memory card slot, or connection ports (e.g., USB, Ethernet, optical). In particular embodiments, a network-enabled device may be able to connect to a power adapter, draw power from a received RF signal, generate power using integrated piezoelectric components, or otherwise utilize power using any conventional source.

In particular embodiments, network-enabled devices may be able to connect to network 710 and communicate with each other or with social-networking system 760 through network 710. In particular embodiments, a network-enabled device may be configured to access a user profile for a user (e.g., on social-networking system 760 based on the user's identifier on social-networking system 760), from which the network-enabled device may retrieve user-preference information, social-graph information, network connectivity settings, or any other user-specific information. Network-enabled devices may also be able to communicate directly with each other using a direct connection (e.g., WI-FI DIRECT) without going through network 710. Network 710 may be a local private network or a network connected to the Internet. As an example and not by way of limitation, network 710 may include a local access point (e.g., a user's home Wi-Fi network) that is connected to the Internet. In particular embodiments, a network-enabled device may obtain configuration information or user-preference information from the Internet (e.g., a manufacturer's website) or from social-networking system 760. Although this disclosure describes and illustrates particular network-enabled devices that are part of particular device clouds, this disclosure contemplates any suitable network-enabled devices that are part of any suitable device clouds.

In the example of FIG. 1, the network-enabled devices of device cloud 100 are associated with a particular user, and some of the network-enabled devices may be able to communicate or interact with each other. As an example and not by way of limitation, security system 150 may include a camera that senses a visitor at the front door of the user's home. Security system 150 may send an image or a video feed from the camera to television 160 where it is displayed for the user to see. The user may indicate that the visitor is a friend and should be let in, and through television 160 or user's tablet 180, user may send a message to door-lock mechanism 110 to unlock the door. Alternately, security system 150 may send an image of the visitor to social-networking system 760, where the visitor is identified as a friend of the user or someone with authorization to enter the user's home. Social-networking system 760 may then send a message to the user regarding the visitor or may send an instruction to door-lock mechanism 110 to unlock the door for the visitor. As another example and not by way of limitation, refrigerator 140 may sense that the milk in the refrigerator is past its expiration date and that the user is almost out of eggs. Refrigerator 140 may send information to the user's tablet 180 so that tablet 180 displays a reminder to the user to buy more milk and eggs.

Once a user has set up one or more network-enabled devices, the user may wish to securely provide a guest with access to devices in the user's device cloud (e.g., refrigerator 140, TV 160, and automobile 170). The guest may be authenticated in accordance with social-graph information and other social-networking information (e.g., first-degree friends may automatically be authenticated to access and use the user's devices). Such access may be granted/restricted according to any property or attribute associated with an element of the user's social graph (e.g., allowing other social-network users in a designated "Close Friends" group to be automatically authenticated upon entering the user's home).

In particular embodiments, a network-enabled device may attempt to authenticate and/or authorize access for a guest. For example, TV 160 may retrieve a social-networking user ID for a guest, access social-networking system 760, and determine whether the guest and the user are connected within a social graph of social-networking system 760. If yes, TV 160 may recognize the guest as a friend of the user and display an interface for the user to grant credentials to the guest. Such credentials may be assigned an expiration timestamp or be revoked after a particular period of time. In particular embodiments, a network-enabled device may grant access in accordance with an authorization level based on whether the guest is connected to the user within a threshold degree of separation, based on whether the guest belongs to a user-designated group of trusted friends (or a user-designated blacklist of untrusted friends), or based on some other information associated with the guest.

In particular embodiments, granting access and/or control to a guest may also include steps to authorize the guest to access different features of a user's network-enabled device. For example, at the moment when a user confirms that a guest should be authenticated, the user may also manually configure access permissions for the guest with respect to the device. In another example, access permissions may be automatically configured in accordance with the guest's social-networking profile and other social-networking information. For example, if the guest is a child, the TV's range of channels may automatically be limited to those deemed appropriate for children.

In a situation involving one or more roaming users who are not members of the household, varying levels of control may be granted to the roaming users based on social-networking information or other information. For example, differing access permissions may be granted to different service providers depending on their different roles (e.g., gardeners may need access to a side gate to the backyard, but not access into the house; a nanny may need access to the house, but not to the parents' bedroom or the home office; a housecleaner may need access to almost all areas of the house; houseguests staying at the house while the owner is away may obtain access to everything except particular closets and the liquor cabinet, and may not be granted access to purchase on-demand movies). In particular embodiments, some access permissions may be based at least in part on particular times or dates. As an example and not by way of limitation, a dog-sitter who comes three times a week at a particular time may be authorized to enter the user's home only during those days and times. As another example and not by way of limitation, a neighbor may be given authorization to enter a user's home while the user is away on vacation.

Other roaming users to whom members of the household may be connected by way of a social graph may be granted permissions in accordance with social graph information and other social-networking information (e.g., first-degree friends may automatically be granted access to the home Wi-Fi network). Such permissions may be granted/restricted by, as examples without limitation: (1) restricting access to other social-network users (e.g., by confirming that they have a valid user identifier), (2) restricting access to other social-network users within their social graph, (3) restricting access to other social-network users within a threshold degree of separation, (4) restricting access based on a coefficient quantifying a strength of the relationship between a first and second user, or (5) restricting access according to any other suitable property or attribute associated with an element of the user's social graph (e.g., only allowing access to other social-network users in a designated group).

In particular embodiments, a user may be able to activate, control, and otherwise use the network-enabled devices in their device cloud 100. One or more network-enabled devices in device cloud 100 may be used to communicate with and control (actively or automatically) one or more other network-enabled devices in the device cloud. A control interface may be provided on one device ("the control device") to control other devices in the device cloud. As an example and not by way of limitation, a user's smartphone 120 or tablet 180 may display a user interface for accessing or controlling lights, a heating/cooling system, door-lock mechanism 110, or security system 150. In particular embodiments, the control device may only provide controls for particular "controllable" devices in the device cloud, e.g., those that are sensed within a threshold proximity, those that include a remote-interaction interface by which the device can receive and process commands for remote control, those for which the user has been granted authorization to control the device, or those that are available (e.g., powered on, connected to a network, operational, and/or enabled for remote control).

In another example scenario, if a user is working in their home office upstairs with the door closed, the user's computer 130 may display a first notification when the front door door-lock mechanism 110 is being opened by someone with a key (at which point a control interface may appear on the screen of computer 130 to display an image of the user's child captured by a camera of security system 150 mounted at the front door). Then, computer 130 may display a second notification when the TV downstairs has just been turned on and the channel changed to view cartoons (at which point, the control interface may provide a feature to take over control of the TV and either turn it off, change the channel to an educational channel, or transmit audio through the TV's speakers so that the user can tell their child to go do their homework).

Figure 2:
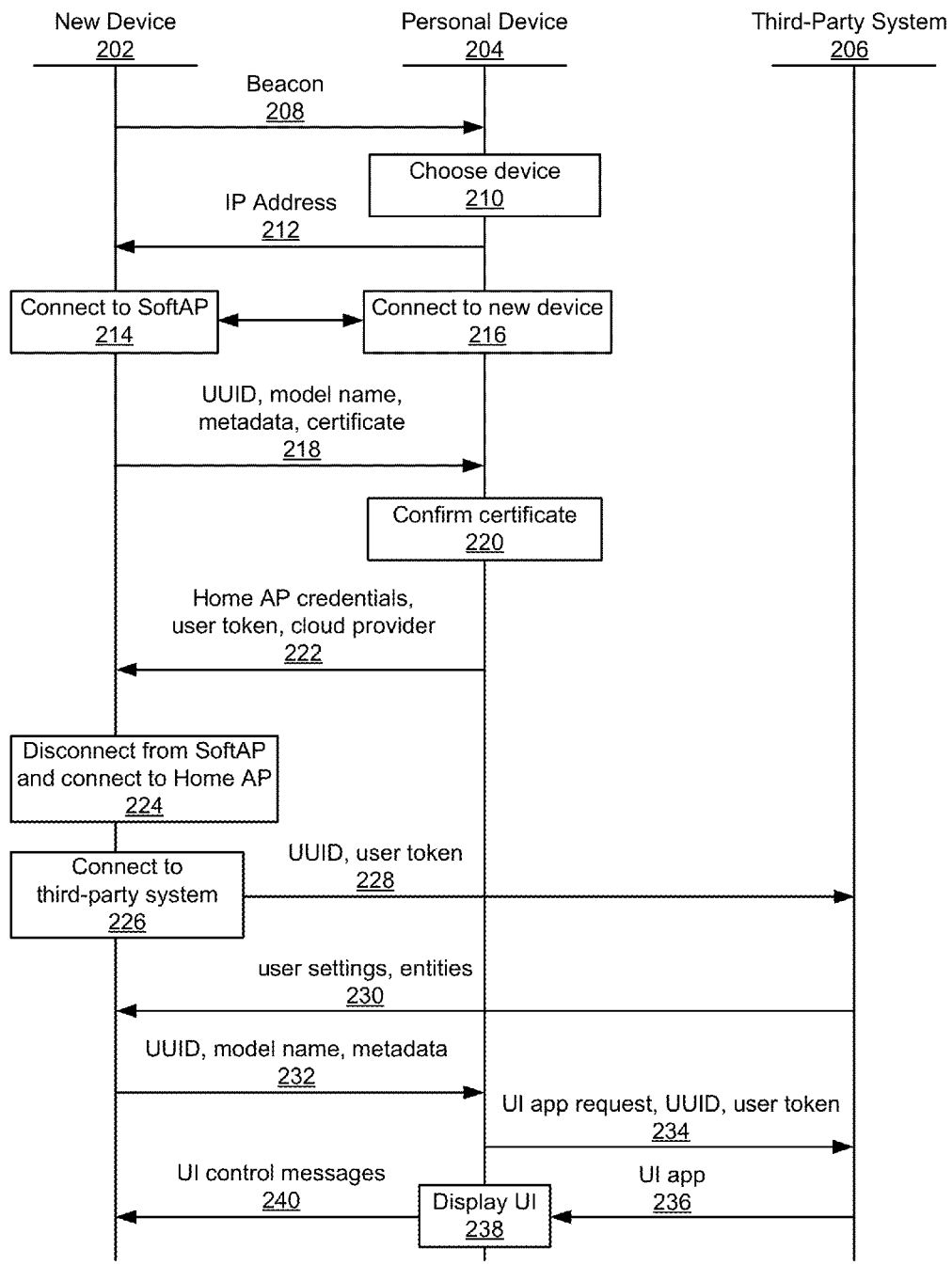
FIG. 2 illustrates an interaction diagram of an example process for associating a network-enabled device with a user.

In particular embodiments, a new network-enabled device, upon initial purchase, may be associated with a user via a secure process. FIG. 2 illustrates an interaction diagram of an example process for associating a network-enabled device with a user. The interaction diagram of FIG. 2 represents a process for initializing new device 202, establishing a relationship between new device 202 and the user's personal device 204, and retrieving information from third-party system 206 in order to enable personal device 204 to control new device 202. New device 202 may be a newly-purchased network-enabled device, and associating new device 202 with a user may be performed when the user first turns on or activates the device. Personal device 204 may be a network-enabled device (e.g., smartphone 120 or tablet 180) capable of exchanging information with new device 202. Third-party system 206 may include a local access point (e.g., home Wi-Fi network), the Internet, social-networking system 760, or a third-party system (e.g., a manufacturer's website or a retailer's website). By associating new device 202 with a user, new device 202 may be added to the user's device cloud, and the user may be able to activate, control, and otherwise use the new device.

In particular embodiments, associating new device 202 with a user may include an authentication or authorization process that involves the exchange of digital certificates, credentials, or tokens to establish a trust relationship between new device 202 and a user or user's personal device 204. As part of the authorization process, new device 202 and personal device 204 may establish a direct peer-to-peer-style connection (e.g., using WI-FI DIRECT) in order to exchange initial information. New device 202 may connect with a generic user application installed on personal device 204 (e.g., smartphone 120 or tablet 180) that exchanges authentication information with new device 202, retrieves device information from third-party system 206, enables new device 202 to connect directly to third-party system 206 through a local access point, and retrieves (from third-party system 206) an application with a user interface (UI) enabling a user to control the device.

In particular embodiments, during an initial authorization process, new device 202 may require that the initial connection be established using a radio that requires very close proximity, such as NFC, or by a Wi-Fi or Bluetooth radio where distance is determined by signal phase or a received signal-strength indicator (RSSI) value, in order to provide extra security and help avoid inadvertently connecting to an unwanted or incorrect device or network. The requirement that a close-proximity connection be established between new device 202 and personal device 204 ensures that new device 202 is close to personal device 204, thus reducing the likelihood of gaining access through spoofing. In particular embodiments, such a close-proximity connection may be established using NFC or another type of wireless technology where the threshold proximity is very low (such that new network-enabled device 202 is required to be very close to personal device 204, as opposed to located in another room or outside a window). The threshold proximity may be determined by the natural range of a particular radio that is to be used for pairing new devices. For example, in order to prevent inadvertent pairings (or attempts to pair a device), some embodiments may require that a NFC radio be used for pairing new devices. In other embodiments (e.g., where pairing is performed using a network technology with a longer signal range, such as WI-FI DIRECT or BLE), the threshold proximity may be configured based on a particular maximum distance, e.g., one foot or less or one meter or less, or in accordance with an RSSI indicator.

Additionally or as an alternative, as part of the initial authorization process, new device 202 may require that it receive user-identifying and/or authentication information. For example, new device 202 may have a personal identification number (PIN) code stored in its memory as well as printed or attached to its exterior or included in its packing material. To establish that the user is in possession of or in close proximity to new device 202, the user must enter this PIN code, either directly into the device (e.g., through a keypad on the device) or into personal device 204, which then sends the code to the network-enabled device for verification. In other particular embodiments, as part of an initial authorization process, a network-enabled device may require verification based on biometric information associated with the user or by the user entering a user ID and password for a social-networking account of the user. In particular embodiments, certain network-enabled devices (e.g., home security system, a safe, a gun locker, a bicycle lock, a laptop security cable) may comprise additional components for security purposes (e.g., sensors and logic to perform biometric identification). Although this disclosure describes and illustrates particular means for authentication of a user or a network-enabled device, this disclosure contemplates any suitable means for authentication of a user or a network-enabled device.

In particular embodiments, a network-enabled device may have a media access control address (MAC address) or a universally unique identifier (UUID) associated with and stored in the device. Initially, upon being powered up or activated, new device 202 may send out a beacon signal 208 that may include the device's MAC address. Personal device 204 may receive beacon signal 208, and information associated with beacon signal 208 may be displayed in a generic user application installed on personal device 204. In step 210, the user may choose new device 202 (e.g., by tapping on an icon associated with new device 202) from a list of devices whose beacons have been detected by personal device 204 (typically, this list should be short), and personal device 204 may send connection information (e.g., IP address 212) to new device 202.

In steps 214 and 216, new device 202 and personal device 204 establish a connection. Personal device 204 may provide a software-enabled access point (SoftAP) for new device 202 to connect to. In particular embodiments, the connection may be a direct connection between the two devices (e.g., using a WI-FI DIRECT protocol) without going through network 710.

After a connection has been established, new device 202 may send initial information 218 associated with new device 202 (e.g., device 202's UUID, device 202's model name, metadata, or a digital certificate) to personal device 204. In step 220, personal device 204 may confirm that the digital certificate received from new device 202 is valid. Then, personal device 204 may send to new device 202 reply information 222, which may include, for example, credentials for the user's home access point (AP), e.g., a home Wi-Fi network or other local area network (LAN), a user token, and any other information that new device 202 may need to connect to a cloud storage service provider.

In step 224, new device 202 may disconnect from the SoftAP provided by personal device 204 and connect to the home AP using the credentials supplied by personal device 204. In step 226, new device 202 may connect to third-party system 206 in order to retrieve information. As an example and not by way of limitation, third-party system 206 may be social-networking system 760 or a third-party website (e.g., a manufacturer's website or a retailer's website).

New device 202 may send user/device-specific information 228 (e.g., UUID and user token) in order to retrieve information 230 from third-party system 206. Information 230 may include, for example, user-specific information, such as user settings, a user profile, or other identifying information for the user, such as the user's social-networking user identifier. Information 230 may also include, for example, user-related information (e.g., information related to other devices in the user's device cloud) or device-related information (e.g., software updates, recall notices).

New device 202 may send information 232 (e.g., UUID, model name, metadata) to personal device 204 in order to enable personal device 204 to retrieve, download, and install software to control new device 202.

Figure 5:
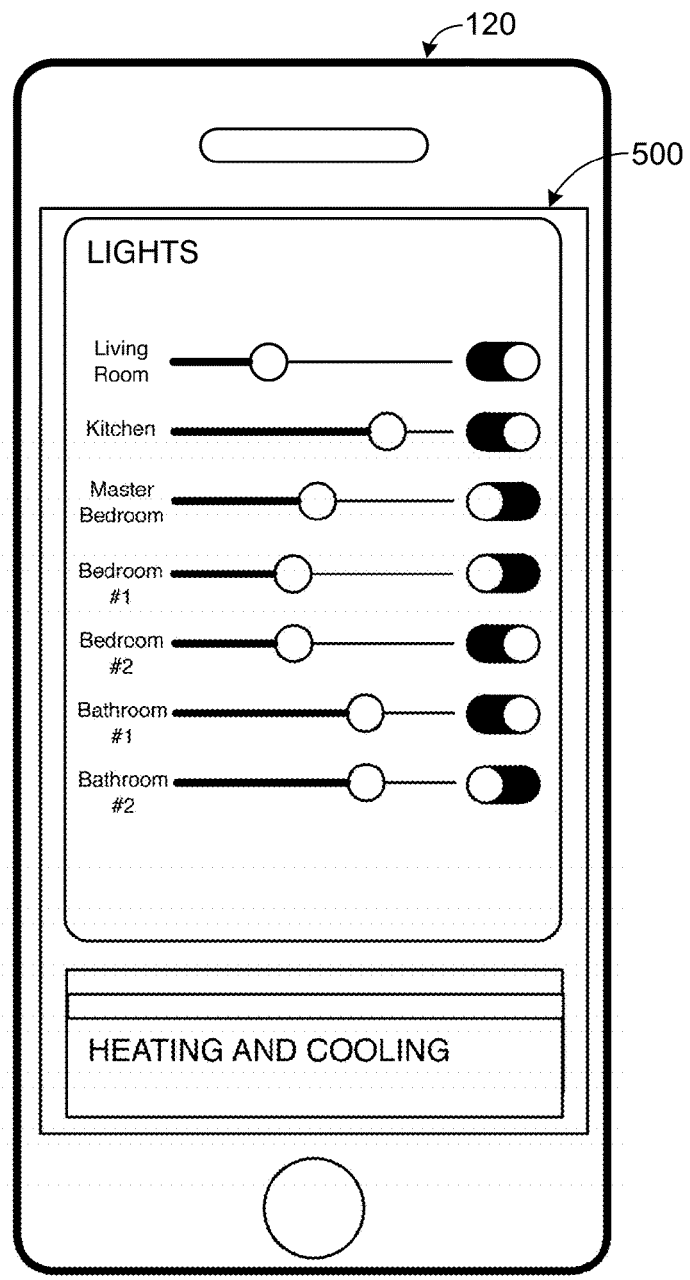
FIG. 5 illustrates an example user interface for controlling network-enabled devices in a device cloud.

Personal device 204 may send a UI app request 234 to third-party system 206 along with the UUID and user token. In response to request 234, personal device 204 may receive UI app 236 which may be installed onto personal device 204. In step 238, personal device 204 may install and launch the application and display a UI (e.g., as shown in FIG. 5) on personal device 204 in order to enable the user to control new device 202. The user of personal device 204 may use the UI to send notifications, information, or control messages (e.g., UI control messages 240) to new device 202.

Although this disclosure describes and illustrates particular processes for associating a network-enabled device with a user, this disclosure contemplates any suitable processes for associating a network-enabled device with a user. Particular embodiments may repeat one or more elements of the interaction diagram of FIG. 2, where appropriate. Although this disclosure describes and illustrates particular elements of FIG. 2 as occurring in a particular order, this disclosure contemplates various elements of the interaction diagram of FIG. 2 occurring in any suitable order. Moreover, although this disclosure describes and illustrates particular components, devices, or systems carrying out particular steps of the diagram of FIG. 2, this disclosure contemplates any suitable combination of any suitable components, devices, or systems carrying out any suitable steps of the diagram of FIG. 2.

Figure 3:
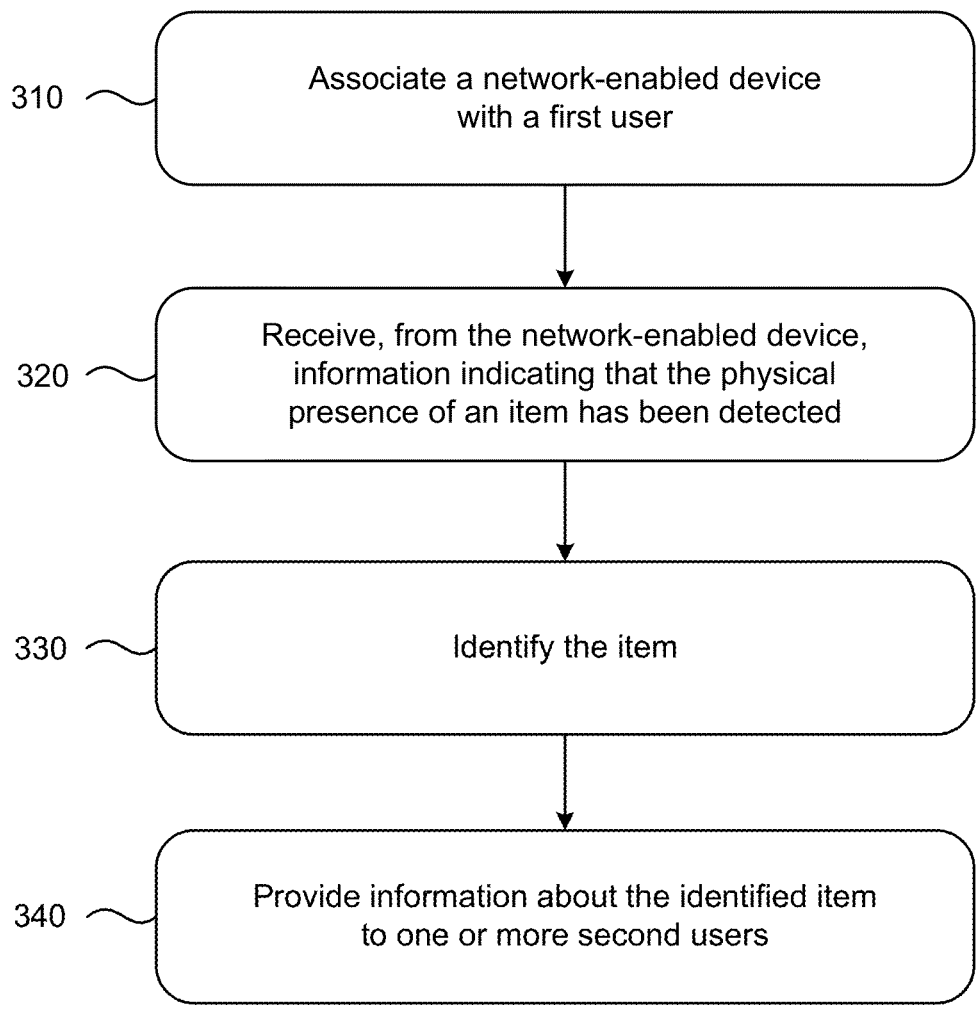
FIG. 3 illustrates an example method for providing information about an item to one or more users.

FIG. 3 illustrates an example method 300 for providing information about an item to one or more users. The method may begin at step 310, where a network-enabled device is associated with a first user. Associating a network-enabled device with a user may include a secure authentication process for establishing a trust relationship between the device and the user. This initial step may be performed at the time when the network-enabled device is first initialized or turned on by the user. Once the network-enabled device is associated with the user, the user may be referred to as an owner of the network-enabled device. As described above, associating the network-enabled device with the first user may be performed in a secure manner involving authentication of the network-enabled device or the user. In particular embodiments, once the network-enabled device is associated with the user, the network-enabled device may connect to social-networking system 760 and access the user's social-networking information (e.g., to obtain user-preference information based on the user's social-networking information). Additionally, the network-enabled device may connect to a manufacturer's or a retailer's website on the Internet to obtain configuration information for the device.

In particular embodiments, associating the network-enabled device with the first user may include determining that the network-enabled device authenticated the first user. As an example and not by way of limitation, a user may enter a PIN that is printed on the network-enabled device to verify that the user is in possession of the network-enabled device. The PIN may be entered directly into the network-enabled device for verification. Alternately, the user may enter the PIN into a personal device of the user (e.g., smartphone 120 or tablet 180) which sends the entered PIN to the network-enabled device for verification. If the entered PIN is valid, the network-enabled device may authenticate the user. As another example and not by way of limitation, the user may enter a passcode or a swipe-gesture pattern or provide a biometric identifier (e.g., a fingerprint scan) to the network-enabled device as a means of authenticating the user to the device.

In particular embodiments, a user being associated with a network-enabled device may indicate that the user is an owner of the network-enabled device. As an example and not by way of limitation, a network-enabled device may have a single owner, where the owner of the device is associated with the device and is authorized to use, configure, and control the device. In particular embodiments, an owner of a network-enabled device may be able to grant access to the device to other users. For example, a user may be given access to a device but not allowed to make changes to the device settings or configuration. Although a network-enabled device has been described as being associated with a single user, in particular embodiments, a network-enabled device may be associated with or used by a group of users (e.g., a family or group of friends). As an example and not by way of limitation, a network-enabled device may have multiple owners (e.g., the members of a family), where each owner is associated with the device and authorized to use, configure, and control the device. As another example and not by way of limitation, a network-enabled device may have one or more owners, each of whom is authorized to use, configure, and control the device. Additionally, the network-enabled device may also have one or more users, each of whom can use the device (e.g., retrieve pictures from camera 190) but may not be authorized to configure, control, or otherwise make changes to the device or its settings. In particular embodiments, a network-enabled device with multiple owners may be associated with a group profile, including any suitable type of information described herein (e.g., group-level authorization and security settings, payment credentials for a group bank account, shared group content).

In particular embodiments, a user being associated with a network-enabled device may indicate that the user is a social-graph connection of an owner of the network-enabled device. In particular embodiments, a network-enabled device may be used in association with social-networking system 760 to automatically detect and permit access to "friends" of a user of the network-enabled device—such access may be restricted by degree of separation within the user's social graph. As an example and not by way of limitation, an owner of a network-enabled device may configure the device to automatically permit access to any close friends of the owner. For example, first-degree friends of the owner may automatically be authenticated to access and use the owner's devices. Additionally, an owner of a network-enabled device may configure the device to prohibit access for users who belong to a particular group (e.g., a blacklist of untrusted social-network connections, as designated by the owner).

At step 320, information indicating that the physical presence of an item has been detected may be received from the network-enabled device. In particular embodiments, the information may be sent by the network-enabled device and received by social-networking system 760. In particular embodiments, the information received from the network-enabled device may include a radio-frequency identification (RFID) message, a Bluetooth message, a WI-FI DIRECT message, or a message sent in any suitable manner. The physical presence of an item may be detected by one or more sensors of the network-enabled device, such as for example, a motion sensor, a light sensor, a heat sensor, a temperature sensor, a humidity sensor, a touch sensor, a weight or pressure sensor, a RFID reader, a camera, a gyroscope, an accelerometer, a seismic-activity sensor, a radiation sensor, or any other suitable sensor or suitable combination of suitable sensors. As an example and not by way of limitation, home-security system 150 may include a motion sensor or a camera for sensing an item. For example, a camera of security system 150 may capture an image or video of a person standing at the front door of a house, and security system 150 may send the image or video to social-networking system 760. As another example and not by way of limitation, refrigerator 140 may include a camera or RFID reader embedded in a shelf or door of refrigerator 140. The camera or RFID reader may capture an image or RFID code, respectively, from an item placed inside refrigerator 140, and refrigerator 140 may send the captured image or RFID code to social-networking system 760. As yet another example, a pressure sensor embedded in the door handle of automobile 170 may sense when a user has touched or pressed on the automobile's door handle. Although this disclosure describes and illustrates particular sensors configured to capture particular information, this disclosure contemplates any suitable sensors configured to capture any suitable information.

In particular embodiments, an item may refer to (1) an inanimate object or a thing (e.g., food item, clothing, tool, toy, book, another device, or any other suitable inanimate object); (2) an animate object or living creature (e.g., a person, a pet, or any other suitable living creature); or (3) a status of or a change in a physical environment (e.g., temperature, humidity, or seismic activity). In particular embodiments, an item may include any suitable animate or inanimate object or physical-environment parameter that can be detected by one or more sensors of a network-enabled device. As an example and not by way of limitation, a motion sensor of security system 150 may detect the physical presence of an item (e.g., a dog) near the front door of a house, and a camera of security system 150 may capture an image of the dog. As another example and not by way of limitation, a network-enabled device with a temperature sensor may sense the temperature in a particular room of a house. Although this disclosure describes and illustrates particular items that may be detected by particular sensors of particular network-enabled devices, this disclosure contemplates any suitable items that may be detected by any suitable sensors of any suitable network-enabled devices.

In particular embodiments, an item being physically present or physically proximate with respect to a network-enabled device may refer to an item located within approximately 1 millimeter, 1 centimeter, 1 meter, 10 meters, or within any suitable distance of the device. As an example and not by way of limitation, a person who stands on the front porch of a house is physically present or proximate with respect to the front door of the house and may be proximate to a camera or motion sensor of security system 150. In other particular embodiments, an item being physically present with respect to a network-enabled device may refer to an item that is touching or located inside the device. As an example and not by way of limitation, a container of milk that was put inside refrigerator 140 may be considered to be physically present with respect to refrigerator 140. As another example and not by way of limitation, a person who gets inside automobile 170 may be considered to be physically present with respect to automobile 170. As yet another example and not by way of limitation, a person who touches a touch sensor of phone 120 or tablet 180 (e.g., using a finger or a stylus) may be considered to be physically present or proximate with respect to phone 120 or tablet 180, respectively. In particular embodiments, an item located more than a particular threshold distance from a network-enabled device may be considered to be not physically present with respect to the network-enabled device. As an example and not by way of limitation, a person walking on the sidewalk past a house may be considered to be not physically present with respect to the front door of the house, while a person standing on the front porch of a house may be considered to be physically present with respect to the front door of the house.

At step 330, the item may be identified. In particular embodiments, the item may be identified by a computing device of social-networking system 760, based at least in part on the information received from the network-enabled device. As discussed above, the item may be any suitable animate or inanimate object. In particular embodiments, the information received from the network-enabled device may include an image captured by the network-enabled device, and identifying the item may include comparing the captured image to images for a set of candidate items to determine a match. In particular embodiments, the images of candidate items may be stored in a database of social-networking system 760. As an example and not by way of limitation, the item may be a carton of eggs, and a camera of refrigerator 140 may capture an image of the carton and send the image to social-networking system 760. Based on images of candidate items stored in a database, social-networking system 760 may compare the captured egg-carton image with candidate-item images and then identify the captured image as that of an egg carton.

In particular embodiments, the images for a set of candidate items may include images uploaded by users of social-networking system 760 and tagged as having been captured in association with an item of the same type as the item detected by the network-enabled device. As an example and not by way of limitation, a camera of security system 150 may capture an image of a person's face, and social-networking system 760 may identify that person as the same person whose image was captured by a neighbor's security system. The person whose image was captured by the neighbor's security system may have been tagged as being a burglar who attempted to rob the neighbor's house, and in response to this identification, security system 150 may alert the homeowner or the police to a possible burglary. As another example and not by way of limitation, a user of social-networking system 760 may upload an image of their dog to social-networking system 760, and a neighbor who is a social-graph connection of the dog's owner may have a security system 150 that captures an image of the dog. Social-networking system 760 may receive the captured image and identify the dog by comparing the captured image to the image uploaded by the dog's owner. Social-networking system 760 may then send a message to the dog's owner that their dog may have escaped from their backyard and is currently in front of the neighbor's house. In particular embodiments, uploaded images may include images deliberately uploaded by a social-network user as well as images automatically uploaded by a device belonging to a social-network user.

In particular embodiments, identifying an item may include performing optical character recognition (OCR) to identify the item based at least in part on text in the captured image. As an example and not by way of limitation, social-networking system 760 may receive an image of a milk carton that includes the milk-carton label, and social-networking system 760 may perform OCR on the image to identify the item as being a one-gallon carton of organic whole milk. In particular embodiments, social-networking system 760 may retrieve item identification (ID) information about the identified item, where item ID information may include a manufacturer identifier, a product identifier (e.g., part number, model number, or product description), a serial number for the item, an expiration date for the item, or a retailer for the item. As an example and not by way of limitation, based on OCR of the milk-carton label, social-networking system 760 may identify the milk producer, the product description (e.g., "whole milk, organic, one gallon"), and the expiration date for the milk.

In particular embodiments, social-networking system 760 may use item ID information to retrieve profile information about an identified item from a third-party system (e.g., a manufacturer's website or a retailer's website). Profile information may refer to any suitable additional information about an identified item. For example, for food items, profile information may include typical shelf life, recipes using the identified item, nutrition information, or portion-size information. As an example and not by way of limitation, based on the identified milk producer and product description, social-networking system 760 may retrieve nutritional information about the milk or a recipe for hot chocolate from the milk producer's website. As another example and not by way of limitation, based on the identified food in a user's refrigerator 140, refrigerator 140 or social-networking system 760 may retrieve recipes from the cloud (e.g., cooking websites, food websites, or other users with a social-graph connection to the user) and suggest them to the user. As yet another example and not by way of limitation, for an identified electronic device (e.g., a smartphone or television), social-networking system 760 may retrieve a user's manual or operation guide for the device from a manufacturer's website.

In particular embodiments, a network-enabled device may include an RFID reader, and an item may have an RFID tag located on or within the item or the item's packaging. In particular embodiments, the information received from the network-enabled device may include an RFID message that was transmitted by the item to the network-enabled device. In particular embodiments, an item may send or transmit an RFID message to an RFID reader using reflected-power (or backscatter) modulation. Identifying the item may include extracting item ID information from the RFID message. As an example and not by way of limitation, refrigerator 140 may include an RFID reader, and an RFID tag embedded in an item placed inside refrigerator 140 (e.g., a carton of orange juice) may be read by the refrigerator's RFID reader. In particular embodiments, a network-enabled device (e.g., refrigerator 140) may send the RFID message to social-networking system 760, where item ID information may be extracted from the RFID message. In other particular embodiments, a network-enabled device may extract item ID information from the RFID message. For a carton of orange juice, item ID information may include a manufacturer (e.g., TROPICANA), a product identifier (e.g., text or a code that indicates "orange juice with calcium and pulp"), or an expiration date. In particular embodiments, based on the extracted item ID information, a network-enabled device or social-networking system 760 may retrieve, from the cloud (e.g., a third-party system such as a manufacturer's website or a retailer's website), profile information about the identified item. As an example and not by way of limitation, social-networking system 760 may extract a manufacturer's name and a model number from an item's RFID message, and social-networking system 760 may then retrieve a user's manual or an application for controlling the item from the manufacturer's website.

In particular embodiments, information received from a network-enabled device may include an RFID message that was transmitted by an item to the network-enabled device, and identifying the item may include comparing information in the RFID message to profile information for candidate items to determine a match. The profile information for the candidate items may be stored in a database of social-networking system 760. In particular embodiments, social-networking system 760 may build up its own database of item profile information using profile information provided by users of social-networking system 760, and this profile information may replace or supplement profile information from a manufacturer, retailer, or other third party. In particular embodiments, profile information for candidate items may include information uploaded by users of social-networking system 760 and tagged as having been captured in association with an item of the same type as the item sensed by the network-enabled device. As an example and not by way of limitation, if a first user has a certain brand of chili sauce, social-networking system 760 may send to the first user postings, searches, or recipes associated with that brand of chili sauce and associated with users who have social-graph connections to the first user.

At step 340, information about an identified item may be provided to one or more second users. In particular embodiments, the information about the identified item may be provided by a computing device of social-networking system 760. Providing information to the one or more second users may include sending the information to one or more network-enabled devices associated with the respective one or more second users. In particular embodiments, the first and second users may be users of social-networking system 760, and the first user may have a social-graph connection with at least one of the second users. As an example and not by way of limitation, the first user's security system 150 may capture an image of a dog located in the first user's front yard. Social-networking system 760 may receive the image from security system 150 and identify the dog as belonging to a neighbor who has a social-graph connection to the first user. Social-networking system 760 may then send a message to the dog's owner (e.g., a notification to the owner's smartphone) indicating that the dog is in the first user's front yard. In particular embodiments, the one or more second users to whom information about an identified item is provided may include the first user. As an example and not by way of limitation, refrigerator 140 may be associated with a first user, and refrigerator 140 or social-networking system 760 may send a message to the first user's smartphone 120 or tablet 180 indicating that milk in the refrigerator is about to expire.

In particular embodiments, providing information about an identified item to the second users of social-networking system 760 may include sending a notification regarding a status of the identified item to the second users. As examples and not by way of limitation, social-networking system 760 may send a notification that the milk in refrigerator 140 is about to expire or that they have run out of eggs. As another example and not by way of limitation, social-networking system 760 may send a notification to a grandparent that their grandchild has arrived home. In such an example, the grandparent may live hundreds or thousands of miles from the grandchild, and based on an image sent to social-networking system 760 by security system 150 at the grandchild's house, social-networking system 760 may identify the grandchild and determine that the grandchild has arrived home. Social-networking system 760 may then send a notification to a network-enabled device located at the grandparent's home. As an example and not by way of limitation, social-networking system 760 may send information to a network-enabled light controller at the grandparent's house that causes a light to change its color (e.g., from bright white to a soft, yellow hue), which indicates to the grandparent that their grandchild has arrived home.

In particular embodiments, providing information about an identified item to the second users of social-networking system 760 may include identifying a target group of users of the social-networking system, where each user in the target group is identified based on profile information of the user, location-based information for the user, an affinity of the user for the identified item, or an authorization level of the user. As an example and not by way of limitation, a user may purchase a particular brand of hot sauce, and a target group of users may receive a notification based on their affinity for that brand of hot sauce or for hot sauce in general. In particular embodiments, providing information about an identified item to the second users of social-networking system 760 may also include evaluating each user in the target group of users based on privacy settings for the identified item. As an example and not by way of limitation, a child may be associated with a privacy setting that only allows close family (e.g., the child's parents, siblings, and grandparents) to be provided with information about the child.

Particular embodiments may repeat one or more steps of method 300 of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
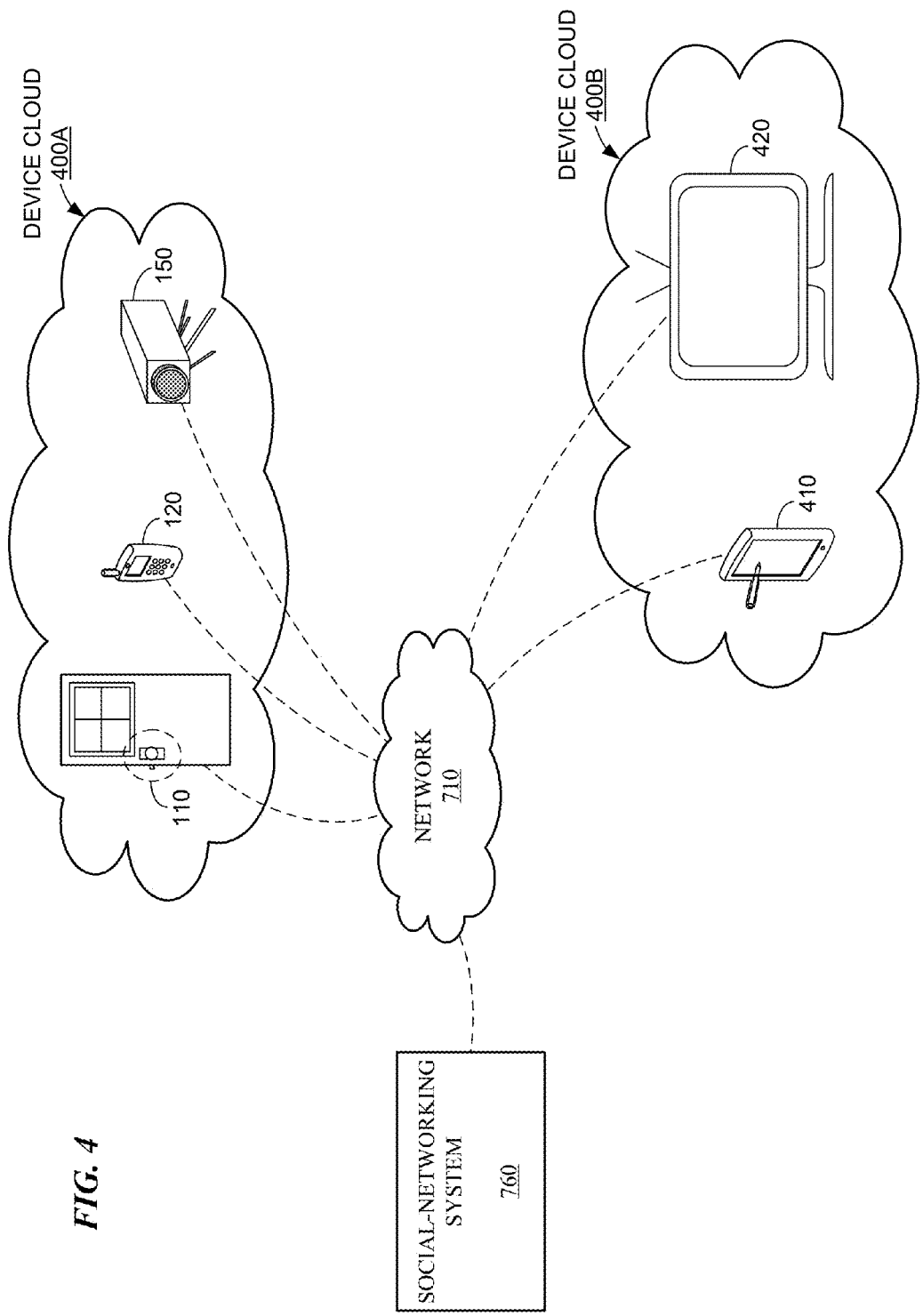
FIG. 4 illustrates two example device clouds.

FIG. 4 illustrates two example device clouds 400A and 400B. Device cloud 400A may include network-enabled devices associated with a first user, and device cloud 400B may include another group of network-enabled devices associated with a second user. Devices in device clouds 400A and 400B may be connected to network 710 as well as social-networking system 760. The first user and second users may be users of social-networking system 760, and the first user may have a social-graph connection with the second user. In particular embodiments, particular devices in device clouds 400A and 400B may control or send information to other particular devices in device clouds 400A and 400B. In particular embodiments, particular devices in device clouds 400A and 400B may send information to social-networking system 760 that results in a notification or a control message being sent to other particular devices in device clouds 400A and 400B. As an example and not by way of limitation, an image captured by the first user's security system 150 may result in a message being sent by social-networking system 760 to the second user's tablet 410 or television 420. As another example and not by way of limitation, an image captured by the first user's security system 150 may result in a message being sent to door-lock mechanism 110 to unlock the first user's front door.

FIG. 5 illustrates an example user interface (UI) 500 for controlling network-enabled devices in a device cloud. In the example illustrated in FIG. 5, UI 500 is displayed on the screen of a user's smartphone 120. In particular embodiments, UI 500 may be displayed on a home screen of smartphone 120, or even in a locked-screen interface (thereby being available for use without requiring a user to unlock smartphone 120). Upon receiving user input selecting a particular device presented in the UI that the user wishes to access or control, the control device presents a UI to control the selected device. The example UI in FIG. 5 illustrates an interface that enables smartphone 120 to act as a remote control for the lights in a user's house, allowing the lights to be dimmed and turned on or off. The example UI in FIG. 5 also illustrates a minimized interface for controlling heating and cooling in a user's house. Tapping on the portion of the UI labeled "Heating and Cooling" may cause the light-control interface to be minimized and the heating and cooling interface to be maximized. In particular embodiments, control commands may be sent directly from the user's device displaying the UI to the selected network-enabled device. In other particular embodiments, control commands may be sent to the selected network-enabled device by way of social-networking system 760.

Figure 6:
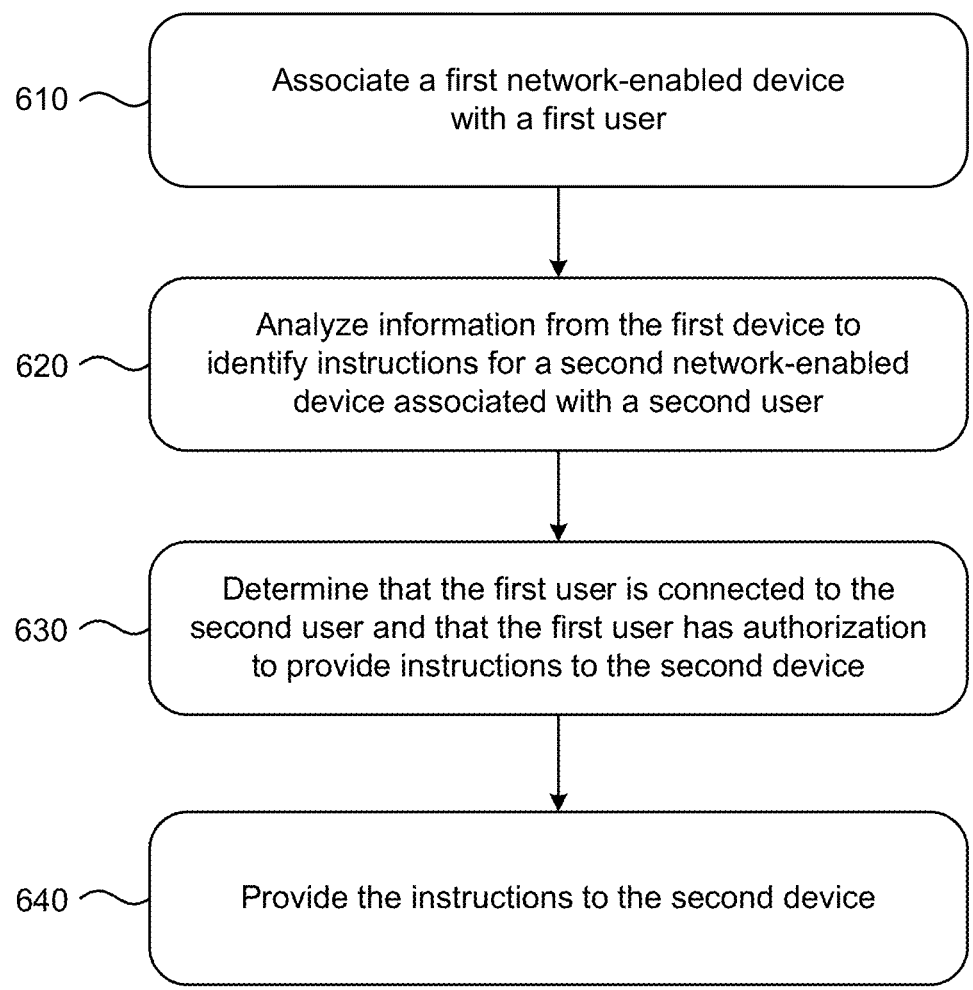
FIG. 6 illustrates an example method for providing instructions to a network-enabled device.

FIG. 6 illustrates an example method 600 for providing instructions to a network-enabled device. The method may begin at step 610, where a first network-enabled device is associated with a first user. As discussed above, associating a network-enabled device with a user may include a secure authentication process for establishing a trust relationship between the device and the user. This initial step may be performed at the time when the network-enabled device is first initialized or turned on by the user. Associating a network-enabled device with a user may be performed in a secure manner involving authentication of the network-enabled device or the user. In particular embodiments, a user being associated with a network-enabled device may include the user being a social-graph connection of an owner of the network-enabled device. In other particular embodiments, a user being associated with a network-enabled device may include the user being an owner of the network-enabled device.

At step 620, information from the first network-enabled device may be analyzed to identify instructions for a second network-enabled device associated with a second user. The first and second users may be users of social-networking system 760. In particular embodiments, the information may be sent from the first network-enabled device to social-networking system 760, and the information may be analyzed by a computing device of social-networking system 760. The information may be captured by one or more sensors of the network-enabled device, such as for example, a motion sensor, a light sensor, a heat sensor, a temperature sensor, a humidity sensor, a touch sensor, a weight or pressure sensor, a radio-frequency identification (RFID) reader, a camera, a gyroscope, an accelerometer, a seismic-activity sensor, a radiation sensor, or any other suitable sensor or suitable combination of suitable sensors. As an example and not by way of limitation, the information may include an image of a child entering their home, where the image is captured by a camera of security system 150. The captured image may be sent from security system 150 to social-networking system 760 where it is analyzed to determine that the child has arrived at their home (e.g., the child has returned home from their day at school). In response to determining that the child has arrived home, social-networking system 760 may identify an instruction for a network-enabled device associated with the child's parent or grandparent. As an example and not by way of limitation, the instruction may include information (e.g., a notification or the captured image) to be sent to a parent's smartphone indicating that the child has arrived home. As another example and not by way of limitation, the instruction may include information or a control message to be sent to a network-enabled picture frame at the grandparent's house that causes an image of the child in the picture frame to light up, indicating to the grandparent that the child has arrived home.

In particular embodiments, the information may indicate that changes to a physical environment (e.g., ambient light, temperature, change in time zone) of the first network-enabled device triggered transmission of the information to social-networking system 760, and the changes in the environment were detected by sensors of the first network-enabled device. As an example and not by way of limitation, a signal received by a first user's smartphone from a local network may indicate a change in time zone (e.g., the user's plane has landed in a new time zone), and this time-zone change may trigger the transmission of related information to social-networking system 760. In response to receiving the information, social-networking system 760 may identify an instruction to send a notification related to the first user's time-zone change to a second user's tablet 410 or television 420. As another example and not by way of limitation, a user's ambient-light sensor may detect that the amount of ambient light in a particular room has gone above a particular threshold level (e.g., the sun is shining into the room), and this ambient-light change may trigger the transmission of related information to social-networking system 760.

In particular embodiments, the information may indicate that input information received at the first network-enabled device triggered transmission of the information to social-networking system 760. In particular embodiments, input information received at the first network-enabled device that may trigger transmission of information to social-networking system 760 may include a Short Message Service (SMS) message, a user input, a missed-call notification, a voice-mail, a notification that an invitation was accepted, an alert notification that the first user's flight has been delayed, or any other suitable input information. As an example and not by way of limitation, the first user may receive a notification on smartphone 120 that their flight has been delayed, and smartphone 120 may send information related to the flight delay to social-networking system 760. In response to receiving the flight-delay information, social-networking system 760 may identify an instruction to send a notification related to the first user's flight delay to a second user's tablet 410.

In particular embodiments, the information may indicate that user input received at the first network-enabled device triggered transmission of the information to social-networking system 760. As an example and not by way of limitation, the first user may put smartphone 120 into a sleep or silent mode (e.g., the first user may be going to bed), and smartphone 120 may send information related to this user input to social-networking system 760. In response to receiving the user-input information, social-networking system 760 may identify an instruction to send a notification that the first user has gone to bed to a second user's tablet 410.

At step 630, it may be determined that the first user is connected to the second user with respect to a social graph of social-networking system 760 and that the first user has authorization to provide instructions to the second device. In particular embodiments, the first user's authorization to provide instructions to the second device may be based at least in part on social-networking information. In particular embodiments, determining that the first user has authorization to provide instructions to the second network-enabled device may include: (1) determining that the first user is connected to the second user with respect to the social graph within a threshold degree of separation; (2) determining that a coefficient quantifying a strength of a relationship between the first user and the second user exceeds a specified threshold; or (3) determining that the second user granted permissions to the first user. As an example and not by way of limitation, the first and second users may be family members or close friends, and the first user may be authorized to provide instructions to the second device based on this close relationship. As another example and not by way of limitation, the second user may explicitly grant authorization or permission to the first user to provide instructions to the second device.

At step 640, the instructions may be provided to the second device. In particular embodiments, a computing device of social-networking system 760 may provide the instructions to the second network-enabled device. In particular embodiments, the instructions may include a message, image, or notification to be displayed on the second network-enabled device or an action to be performed by the second network-enabled device. As an example and not by way of limitation, the instructions may include a message to be displayed on the second user's tablet 410, where the message indicates that the first user's flight has been delayed. As another example and not by way of limitation, the instructions may be related to turning on or off a light or unlocking a door in the second user's home. Although this disclosure describes particular instructions provided to particular network-enabled devices, this disclosure contemplates any suitable instructions provided to any suitable network-enabled devices.

In particular embodiments, a user interface to control the second network-enabled device may be provided to the first network-enabled device, where the first network-enabled device is capable of receiving user input and sending information associated with the user input to a network. As an example and not by way of limitation, the first user's smartphone 120 may be provided with a user interface to control a second network-enabled device, such as for example a light, a television, or any other suitable network-enabled device.

Particular embodiments may repeat one or more steps of method 600 of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
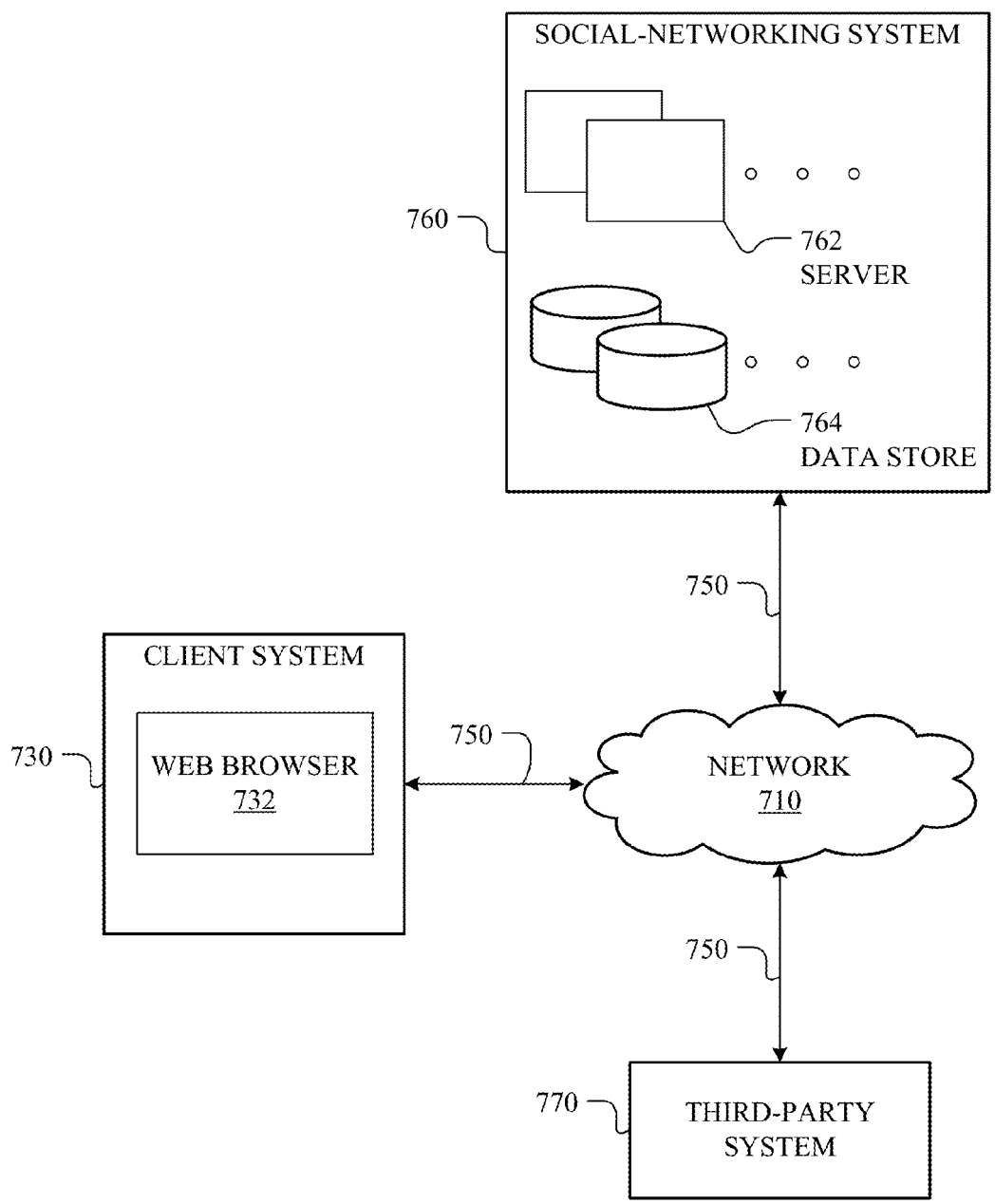
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 whom they want to be connected to. Herein, the term "friend" may refer to any other user of social-networking system 760 with whom a user has formed a connection, association, or relationship via social-networking system 760.

In particular embodiments, social-networking system 760 may provide users with the ability to take actions on various types of objects supported by social-networking system 760. As an example and not by way of limitation, the objects may include groups or social networks to which users of social-networking system 760 may belong, events or calendar entries in which a user might be interested, computer-based applications that a user may use, transactions that allow users to buy or sell things via the service, interactions with advertisements that a user may perform, or other suitable objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
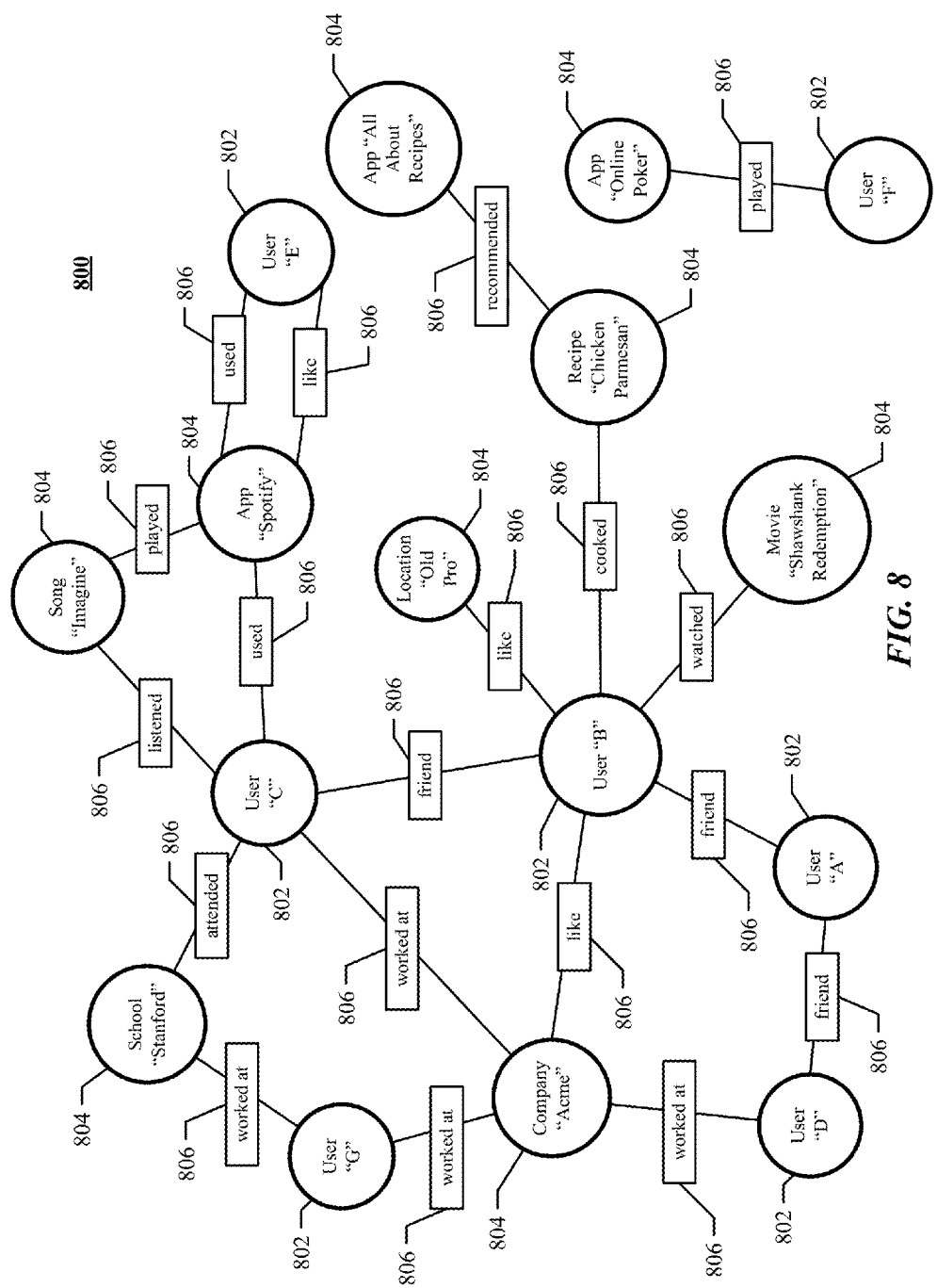
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party server 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 730 to send to social-networking system 760 a message indicating the user's action. In response to the message, social-networking system 760 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 760). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 760. In addition or as an alternative, the social action may be promoted outside or off of social-networking system 760, where appropriate. In particular embodiments, a page may be an on-line presence (such as a webpage or website within or outside of social-networking system 760) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 760. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 760) or RSVP (e.g., through social-networking system 760) to an event associated with the advertisement. In addition or as an alternative, an advertisement may include social-networking-system context directed to the user. For example, an advertisement may display information about a friend of the user within social-networking system 760 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 760 and incorporate the retrieved social-networking functionality or context into the advertisement before serving the advertisement to a user. Examples of selecting and providing social-networking-system functionality or context with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 760.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 760 to identify those users. In addition or as an alternative, social-networking system 760 may use user-profile information in social-networking system 760 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 760, off or outside of social-networking system 760, or on mobile computing devices of users. When on or within social-networking system 760, such targeting may be directed to users' news feeds, search results, e-mail or other in-boxes, or notifications channels or may appear in particular area of web pages of social-networking system 760, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 760, such targeting may be provided through a third-party web-site, e.g., involving an ad exchange or a social plug-in. When on a mobile computing device of a user, such targeting may be provided through push notifications to the mobile computing device.

Targeting criteria used to identify and target users may include explicit, stated user interests on social-networking system 760 or explicit connections of a user to a node, object, entity, brand, or page on social-networking system 760. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. 2008/0040475, entitled "Providing a News Feed Based on User Affinity in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2001/0004692, entitled "Gathering Information about Connections in a Social Networking Service" and filed 1 Jul. 2009 as U.S. patent application Ser.

No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 760 may calculate a coefficient based on a user's actions. Social-networking system 760 may monitor such actions on the online social network, on a third-party system 770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 760 may calculate a coefficient based on the user's actions with particular types of content. The content may be associated with the online social network, a third-party system 770, or another suitable system. The content may include users, profile pages, posts, news stories, headlines, instant messages, chat room conversations, emails, advertisements, pictures, video, music, other suitable objects, or any combination thereof. Social-networking system 760 may analyze a user's actions to determine whether one or more of the actions indicate an affinity for subject matter, content, other users, and so forth. As an example and not by way of limitation, if a user may make frequently posts content related to "coffee" or variants thereof, social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 760 may calculate a coefficient based on the type of relationship between particular objects. Referencing the social graph 800, social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 760 may determine that the user has a higher coefficient with respect to the first photo than the second photo because having a tagged-in-type relationship with content may be assigned a higher weight and/or rating than having a like-type relationship with content. In particular embodiments, social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, social-networking system 760 may determine that the user has a higher coefficient for the airport than the gas station based on the proximity of the airport to the user.

In particular embodiments, social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 760 may provide information that is relevant to user's interests and current circumstances, increasing the likelihood that they will find such information of interest. In particular embodiments, social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, social-networking system 760 may calculate the coefficient (or access the coefficient information if it has previously been calculated and stored). In particular embodiments, social-networking system 760 may measure an affinity with respect to a particular process. Different processes (both internal and external to the online social network) may request a coefficient for a particular object or set of objects. Social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 760 or shared with other systems (e.g., third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 762 may be authorization/privacy servers for enforcing privacy settings. In response to a request from a user (or other entity) for a particular object stored in a data store 764, social-networking system 760 may send a request to the data store 764 for the object. The request may identify the user associated with the request and may only be sent to the user (or a client system 730 of the user) if the authorization server determines that the user is authorized to access the object based on the privacy settings associated with the object. If the requesting user is not authorized to access the object, the authorization server may prevent the requested object from being retrieved from the data store 764, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
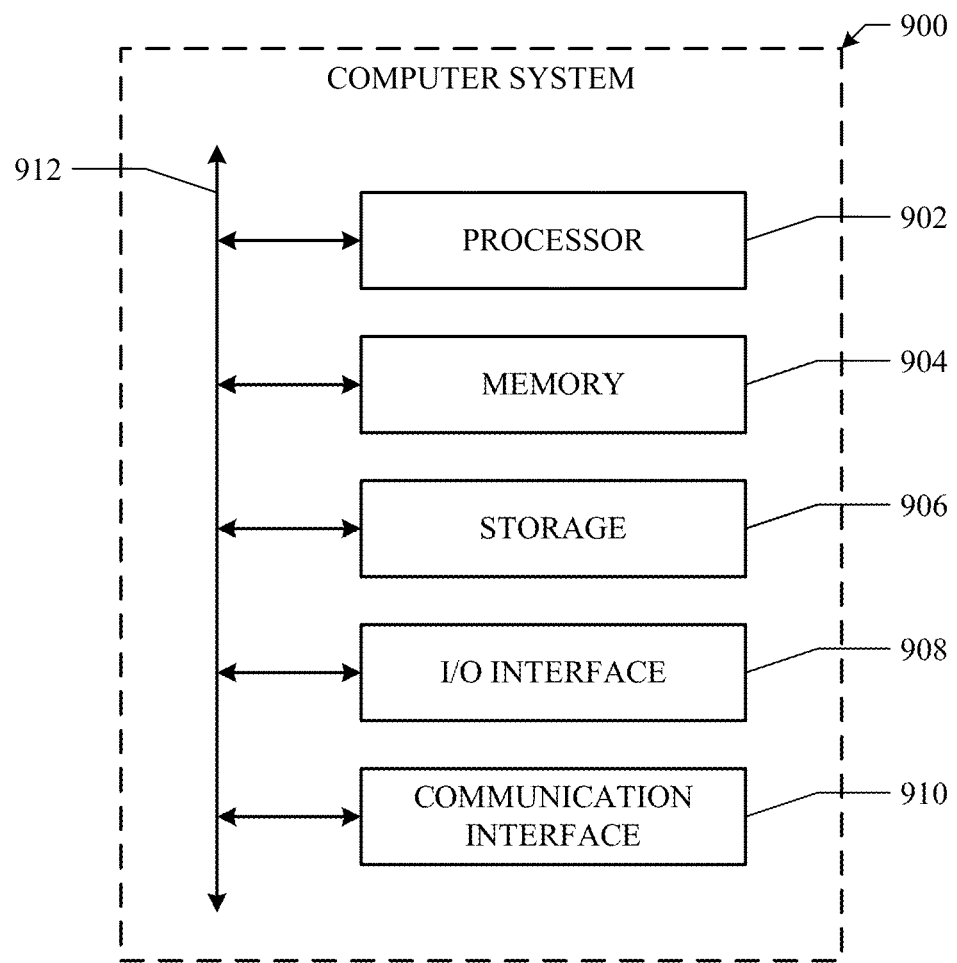
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate, such as dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by a computing device of a social-networking system, information from a network-enabled device associated with a physical location, the network-enabled device being associated with a first user of the social-networking system, wherein the information indicates that an image of an item has been captured by one or more sensors of the network-enabled device when the item had a physical presence proximate to the physical location of the network-enabled device;
   identifying, by the computing device of the social-networking system, the item based on a comparison of the image of the item with an image of each of a plurality of candidate items;
   identifying, by the computing device of the social-networking system, one or more second users of the social-networking system based on an association of the identified item with one or more of the second users; and
   providing, by the computing device of the social-networking system, information about the identified item to one or more of the second users.

2. The method of claim 1, wherein the images of each of the plurality of candidate items are stored in a database of the social-networking system.

3. The method of claim 2, wherein the images of each of the plurality of candidate items comprise images uploaded by users of the social-networking system and tagged as having been captured in association with an item of the same type as the identified item.

4. The method of claim 1, wherein the information received from the network-enabled device comprises a message that was transmitted by the item to the network-enabled device, and wherein the identifying the item further comprises:
   extracting item identification (ID) information from the message, wherein the item ID information comprises a manufacturer ID and a product ID for the identified item; and retrieving, from a third-party system, using the item ID information, profile information about the identified item.

5. The method of claim 1, wherein the information received from the network-enabled device comprises a message that was transmitted by the item to the network-enabled device, and wherein the identifying the item further comprises:
comparing information in the message to profile information for candidate items to determine a match, wherein the profile information for the candidate items is stored in a database of the social-networking system.

6. The method of claim 5, wherein the profile information for candidate items comprises information uploaded by users of the social-networking system and tagged as having been captured in association with an item of the same type as the identified item.

7. The method of claim 1, wherein the providing information about the identified item to the second users of the social-networking system comprises sending a notification regarding a status of the identified item to the second users of the social-networking system.

8. The method of claim 1, wherein the identifying of the second users:
identifying a target group of users of the social-networking system, wherein each user in the target group is identified based on profile information of the user, location-based information for the user, an affinity of the user for the identified item, or an authorization level of the user.

9. The method of claim 8, wherein the identifying of the second users further comprises:
evaluating each user in the target group of users based on privacy settings for the identified item.

10. The method of claim 1, wherein the first user has a social-graph connection with at least one of the second users.

11. The method of claim 1, wherein the network-enabled device being associated with the first user comprises the network-enabled device authenticating the first user.

12. The method of claim 1, wherein the network-enabled device being associated with the first user comprises the first user being an owner of the network-enabled device.

13. The method of claim 1, wherein the network-enabled device is associated with the first user through a secure authentication process.

14. One or more computer-readable non-transitory storage media embodying software that is operable when executed to:
receive information from a network-enabled device associated with a physical location, the network-enabled device being associated with a first user of the social-networking system, wherein the information indicates that an image of an item has been captured by one or more sensors of the network-enabled device when the item had a physical presence proximate to the physical location of the network-enabled device;
identify the item based on a comparison of the image of the item with an image of each of a plurality of candidate items;
identify one or more second users of the social-networking system based on an association of the identified item with one or more of the second users; and
provide information about the identified item to one or more of the second users.

15. The media of claim 14,
wherein the images of each of the plurality of candidate items are stored in a database of the social-networking system.

16. The media of claim 15, wherein the images of each of the plurality of candidate items comprise images uploaded by users of the social-networking system and tagged as having been captured in association with an item of the same type as the identified item.

17. The media of claim 14, wherein the information received from the network-enabled device comprises a message that was transmitted by the item to the network-enabled device, and wherein identifying the item further comprises:
extracting item identification (ID) information from the message, wherein the item ID information comprises a manufacturer ID and a product ID for the identified item; and
retrieving, from a third-party system, using the item ID information, profile information about the identified item.

18. The media of claim 14, wherein the information received from the network-enabled device comprises a message that was transmitted by the item to the network-enabled device, and wherein identifying the item further comprises:
comparing information in the message to profile information for candidate items to determine a match, wherein the profile information for the candidate items is stored in a database of the social-networking system.

19. The media of claim 18, wherein the profile information for candidate items comprises information uploaded by users of the social-networking system and tagged as having been captured in association with an item of the same type as the identified item.

20. The media of claim 14, wherein the software is further operable to send a notification regarding a status of the identified item to the second users of the social-networking system.

21. The media of claim 14, wherein the software is further operable to:
identify a target group of users of the social-networking system, wherein each user in the target group is identified based on profile information of the user, location-based information for the user, an affinity of the user for the identified item, or an authorization level of the user.

22. The media of claim 21, wherein the software is further operable to:
evaluate each user in the target group of users based on privacy settings for the identified item.

23. The media of claim 14, wherein the first user has a social-graph connection with at least one of the second users.

24. The media of claim 14, wherein the network-enabled device being associated with the first user comprises the network-enabled device authenticating the first user.

25. The media of claim 14, wherein the network-enabled device being associated with the first user comprises the first user being an owner of the network-enabled device.

26. The media of claim 14, wherein the network-enabled device is associated with the first user through a secure authentication process.

27. A system comprising:
one or more processors; and
a memory coupled to the processors comprising instructions executable by the processors, the processors being operable when executing the instructions to:
receive information from a network-enabled device associated with a physical location, the network-enabled device being associated with a first user of the social-networking system, wherein the information indicates that an image of an item has been captured by one or more sensors of the network-enabled device when the item had a physical presence proximate to the physical location of the network-enabled device;

identify the item based on a comparison of the image of the item with an image of each of a plurality of candidate items;

identify, by the computing device of the social-networking system, one or more second users of the social-networking system based on an association of the identified item with one or more of the second users; and provide information about the identified item to one or more of the second users.

28. The system of claim 27, wherein the images of each of the plurality of candidate items are stored in a database of the social-networking system.

29. The system of claim 28, wherein the images of each of the plurality of candidate items comprise images uploaded by users of the social-networking system and tagged as having been captured in association with an item of the same type as the identified item.

30. The system of claim 27, wherein the information received from the network-enabled device comprises a message that was transmitted by the item to the network-enabled device, and wherein the processors are further operable to:

extract item identification (ID) information from the message, wherein the item ID information comprises a manufacturer ID and a product ID for the identified item; and retrieve, from a third-party system, using the item ID information, profile information about the identified item.

31. The system of claim 27, wherein the information received from the network-enabled device comprises a message that was transmitted by the item to the network-enabled device, and wherein the processors are further operable to:

compare information in the message to profile information for candidate items to determine a match, wherein the profile information for the candidate items is stored in a database of the social-networking system.

32. The system of claim 31, wherein the profile information for candidate items comprises information uploaded by users of the social-networking system and tagged as having been captured in association with an item of the same type as the identified item.

33. The system of claim 27, wherein the processors are further operable to send a notification regarding a status of the identified item to the second users of the social-networking system.

34. The system of claim 27, wherein the processors are further operable to:

identify a target group of users of the social-networking system, wherein each user in the target group is identified based on profile information of the user, location-based information for the user, an affinity of the user for the identified item, or an authorization level of the user.

35. The system of claim 34, wherein the processors are further operable to:

evaluate each user in the target group of users based on privacy settings for the identified item.

36. The system of claim 27, wherein the first user has a social-graph connection with at least one of the second users.

37. The system of claim 27, wherein the network-enabled device being associated with the first user comprises the network-enabled device authenticating the first user.

38. The system of claim 27, wherein the network-enabled device being associated with the first user comprises the first user being an owner of the network-enabled device.

39. The system of claim 27, wherein the network-enabled device is associated with the first user through a secure authentication process.

* * * * *